(12) United States Patent
Bhunia et al.

(10) Patent No.: US 12,118,282 B2
(45) Date of Patent: Oct. 15, 2024

(54) REMOVAL OF HARDWARE INTELLECTUAL PROPERTY AND PROGRAMMABLE REPLACEMENT

(71) Applicants: University of Florida Research Foundation, Incorporated, Gainesville, FL (US); Intel Corporation, Santa Clara, CA (US)

(72) Inventors: Swarup Bhunia, Gainesville, FL (US); Abdulrahman Alaql, Gainesville, FL (US); Nij Dorairaj, Santa Clara, CA (US); David Kehlet, Santa Clara, CA (US)

(73) Assignees: University of Florida Research Foundation, Incorporated, Gainesville, FL (US); Intel Corporation, Santa Clara, CA (US)

( * ) Notice: Subject to any disclaimer, the term of this patent is extended or adjusted under 35 U.S.C. 154(b) by 448 days.

(21) Appl. No.: 17/551,318

(22) Filed: Dec. 15, 2021

(65) Prior Publication Data
US 2022/0198108 A1    Jun. 23, 2022

Related U.S. Application Data

(60) Provisional application No. 63/199,333, filed on Dec. 21, 2020.

(51) Int. Cl.
G06F 30/327    (2020.01)
G06F 9/448    (2018.01)
(Continued)

(52) U.S. Cl.
CPC .......... *G06F 30/327* (2020.01); *G06F 9/4498* (2018.02); *G06F 30/34* (2020.01); *G06F 2119/06* (2020.01)

(58) Field of Classification Search
USPC ......................................................... 716/104
See application file for complete search history.

(56) References Cited

U.S. PATENT DOCUMENTS 8,903,561 B1 * 12/2014 Mannepalli ............. F24S 50/00
                                                                                   700/297
2008/0216024 A1 * 9/2008 New ....................... G06F 30/30
                                                                                  716/100

(Continued)

*Primary Examiner* — Mohammed Alam
(74) *Attorney, Agent, or Firm* — ALSTON & BIRD LLP

(57) ABSTRACT

In general, embodiments of the present disclosure provide methods, apparatus, systems, computer program products, computing devices, computing entities, and/or the like for altering a design of a hardware intellectual property (IP). In accordance with various embodiments, a representation of the design of the hardware IP is converted to generate a control and data flow graph (CDFG) for the design. An entropy analysis of the CDFG is conducted to identify one or more control paths and/or data paths for removal. Responsive to identifying control path(s) for removal, control logic for the control path(s) is removed from the design and replaced with first reconfigurable logic. Responsive to identifying data path(s) for removal, datapath logic for the data path(s) is removed from the design and replaced with second reconfigurable logic. Logic synthesis is then performed on the design, along with verification to check functional correctness of the design of the hardware.

20 Claims, 11 Drawing Sheets

(51) Int. Cl.
 *G06F 30/34* (2020.01)
 *G06F 119/06* (2020.01)

(56) References Cited

U.S. PATENT DOCUMENTS

2011/0299317 A1* 12/2011 Shaeffer ................. G11C 16/26
                                                 257/E21.328
2019/0324436 A1* 10/2019 Cella ......................... H04L 1/18

* cited by examiner

REMOVAL OF HARDWARE INTELLECTUAL PROPERTY AND PROGRAMMABLE REPLACEMENT

CROSS-REFERENCE TO RELATED APPLICATIONS

This application claims priority to U.S. Provisional Patent Application Ser. No. 63/199,333 filed on Dec. 21, 2020, which is incorporated herein by reference in its entirety, including any figures, tables, drawings, and appendices.

GOVERNMENT SUPPORT

This Invention was made with Government support under Agreement No. N00164-19-9-0001, awarded by NSWC Crane Division. The Government has certain rights in the Invention.

TECHNICAL FIELD

The present application relates generally to hardware intellectual property security through altering the intellectual property by removing fundamental portions of the intellectual property and replacing the removed portions by reconfigurable logic.

BACKGROUND

The ability of the semiconductor industry to design, manufacture, and market innovative products in an ever-decreasing production time and reduced cost has resulted in the rapid expansion of human dependency on electronic systems. This significant cutback of production time and cost has been achieved by outsourcing various supply chain stages to specialized third parties across the globe. When a design house or intellectual property (IP) vendor sends a hardware IP to an untrusted party (e.g., an untrusted foundry), the hardware IP is vulnerable to various attacks, including piracy, reverse-engineering, and malicious alteration. Traditional protection techniques such as encryption, which work well in preventing certain attacks for software IPs, have been considered. However, these techniques are often inapplicable for hardware IPs due to the requirement of white-box accessibility by untrusted vendors during the design, verification, integration, and fabrication process.

Therefore, a need exists in the art for improved security for hardware IP to protect against piracy, reverse-engineering, and malicious alterations. It is with respect to these considerations and others that the disclosure herein is presented.

BRIEF SUMMARY

In general, embodiments of the present disclosure provide methods, apparatus, systems, computer program products, computing devices, computing entities, and/or the like for altering a design of a hardware intellectual property (IP). In accordance with various embodiments, a representation of the design of the hardware IP is converted to generate a control and data flow graph (CDFG) for the design. For instance, in particular embodiments, the representation of the design of the hardware IP comprises a register-transfer level or gate-level netlist. An entropy analysis of the CDFG is then conducted to identify at least one of one or more control paths or one or more data paths for removal. Here, in particular embodiments, the entropy analysis involves measuring a quantity of disorder and randomness for each control path and each data path identified in the CDFG for the design of the hardware IP.

Responsive to identifying one or more control paths for removal, control logic for the one or more control paths is removed from the design of the hardware IP and replaced with first reconfigurable logic in the design of the hardware IP. Similarly, responsive to identifying one or more data paths for removal, datapath logic for the one or more data paths is removed from the design of the hardware IP and replaced with second reconfigurable logic in the design of the hardware IP. Logic synthesis is then performed on the design of the hardware IP, along with verification to check functional correctness of the design of the hardware IP. For instance, in particular embodiments, the logic synthesis performed on the design of the hardware IP is carried out for optimization of power-performance-area.

Accordingly, in some embodiments, the control logic includes one or more parts in a finite state machine and the first reconfigurable logic includes one or more logic modules that can re-establish one or more state transition functions in the finite state machine. In addition, in some embodiments, the datapath logic includes a logic fan-in cone and the second reconfigurable logic includes configuration bits representing original functionality of the logic fan-in cone. Further, in some embodiments, the first and second reconfigurable logic include at least one of a hardware lookup table or a programmable interconnect. Furthermore, in some embodiments, the first and second reconfigurable logic are configured to be programmed at every power on by decrypting an encrypted bitstream.

According to an aspect of the present disclosure, a computer-implemented method is provided. The computer-implemented method includes generating a control and data flow graph (CDFG) representing a hardware IP design. The CDFG includes a plurality of control paths and/or data paths. The method further includes performing an entropy analysis of the CDFG to determine an entropy measure for each of the plurality of control paths and/or data paths. The entropy measure represents a complexity of an associated control path or an associated data path. The method further includes identifying a subset of control paths and/or data paths for removal from the hardware IP design based at least in part on the entropy measure for each of the plurality of control paths and/or data paths. The method further includes generating a reduced design based at least in part on: (i) replacing control logic of the hardware IP design represented by each control path of the subset of control paths and/or data paths for removal with first reconfigurable logic, and (ii) replacing datapath logic of the hardware IP design represented by each data path of the subset of control paths and/or data paths with second reconfigurable logic. The method further includes providing access to the reduced design.

According to another aspect of the present disclosure, an apparatus including at least one processor and at least one memory including computer executable instructions is provided. The at least one memory and the computer executable instructions are configured to, with the at least one processor, cause the apparatus to generate a control and data flow graph (CDFG) representing a hardware IP design. The CDFG includes a plurality of control paths and/or data paths. The at least one memory and the computer executable instructions are further configured to, with the at least one processor, cause the apparatus to perform an entropy analysis of the CDFG to determine an entropy measure for each of the plurality of control paths and/or data paths. The entropy measure represents a complexity of an associated control path or an associated data path. The at least one memory and the computer executable instructions are further configured to, with the at least one processor, cause the apparatus to identify a subset of control paths and/or data paths for removal from the hardware IP design based at least in part on the entropy measure for each of the plurality of control paths and/or data paths. The at least one memory and the computer executable instructions are further configured to, with the at least one processor, cause the apparatus to generate a reduced design based at least in part on: (i) replacing control logic of the hardware IP design represented by each control path of the subset of control paths and/or data paths for removal with first reconfigurable logic, and (ii) replacing datapath logic of the hardware IP design represented by each data path of the subset of control paths and/or data paths with second reconfigurable logic. The at least one memory and the computer executable instructions are further configured to, with the at least one processor, cause the apparatus to provide access to the reduced design.

According to yet another aspect of the present disclosure, a computer program product including at least one computer-readable storage medium having computer-readable program code portions stored therein is provided. The computer-readable program code portions include executable portions configured to cause at least one processor to generate a control and data flow graph (CDFG) representing a hardware IP design. The CDFG includes a plurality of control paths and/or data paths. The computer-readable program code portions include executable portions configured to cause at least one processor to perform an entropy analysis of the CDFG to determine an entropy measure for each of the plurality of control paths and/or data paths. The entropy measure represents a complexity of an associated control path or an associated data path. The computer-readable program code portions include executable portions configured to cause at least one processor to identify a subset of control paths and/or data paths for removal from the hardware IP design based at least in part on the entropy measure for each of the plurality of control paths and/or data paths. The computer-readable program code portions include executable portions configured to cause at least one processor to generate a reduced design based at least in part on: (i) replacing control logic of the hardware IP design represented by each control path of the subset of control paths and/or data paths for removal with first reconfigurable logic, and (ii) replacing datapath logic of the hardware IP design represented by each data path of the subset of control paths and/or data paths with second reconfigurable logic. The computer-readable program code portions include executable portions configured to cause at least one processor to provide access to the reduced design.

BRIEF DESCRIPTION OF THE DRAWINGS

Figure 1:
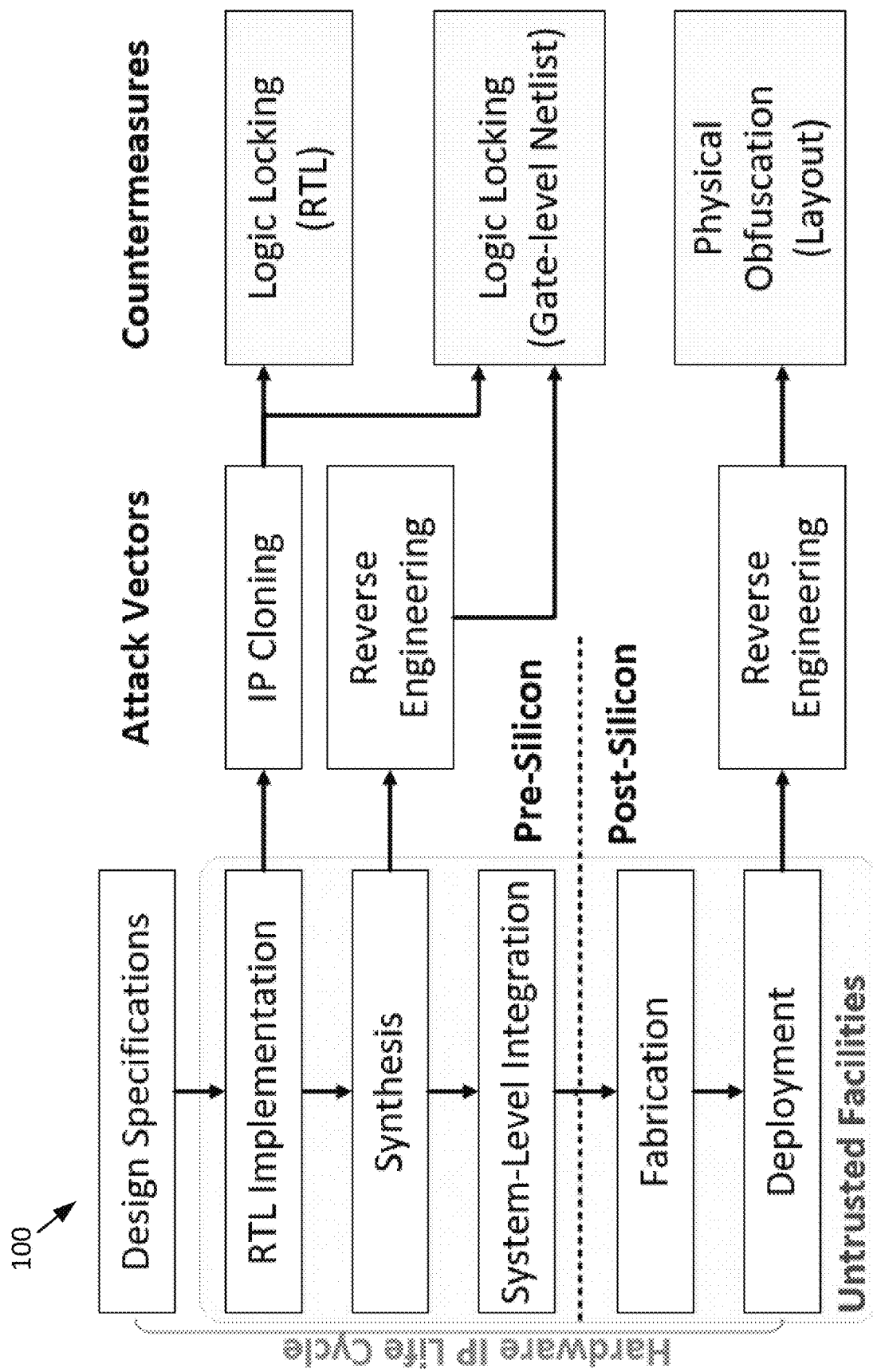
Figure 2:
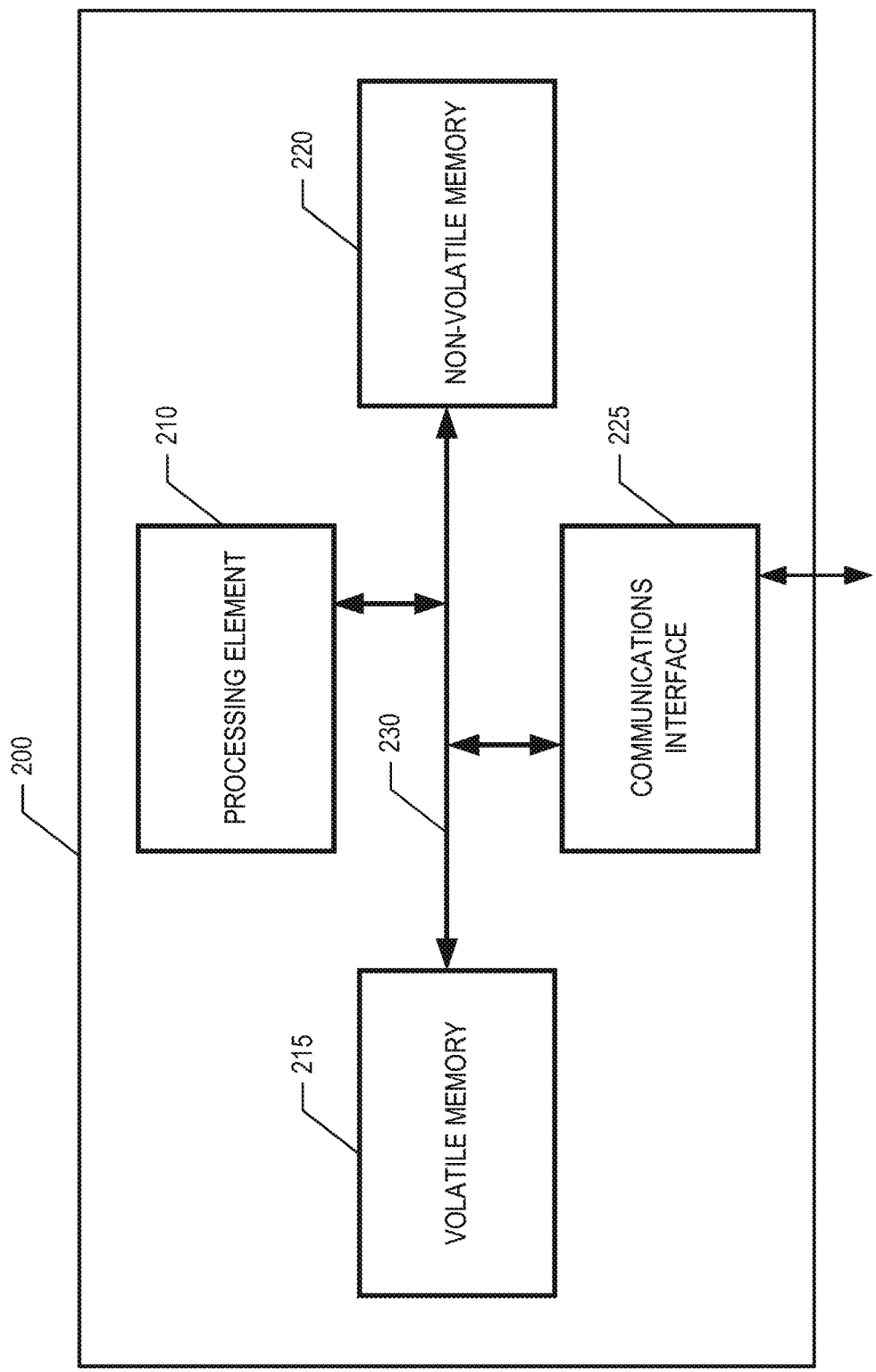
Figure 3:
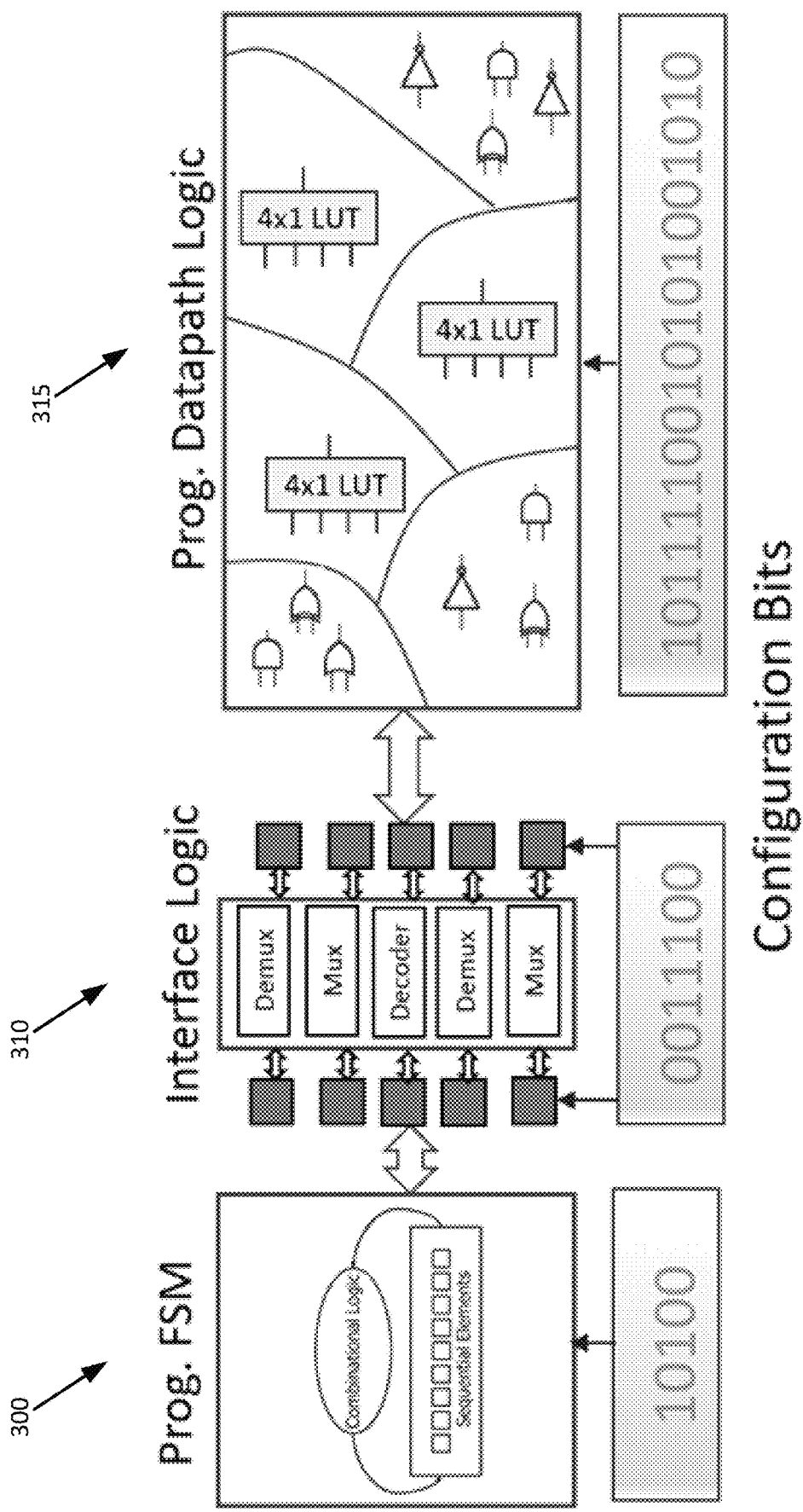
Figure 4:
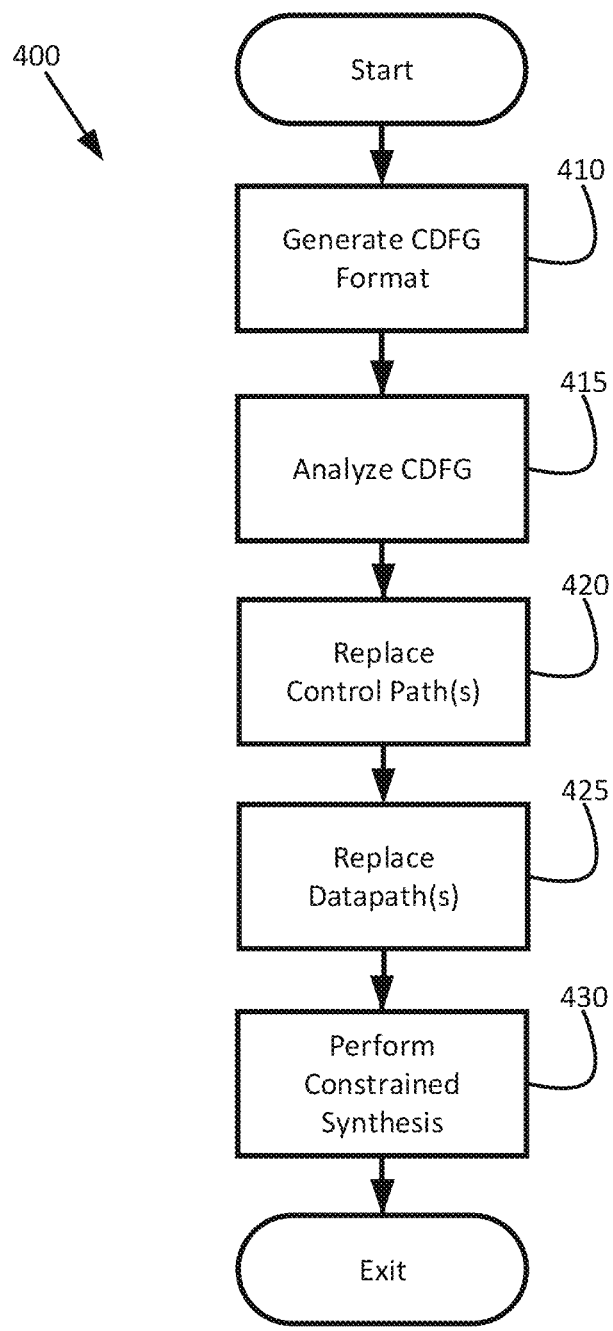
Figure 5:
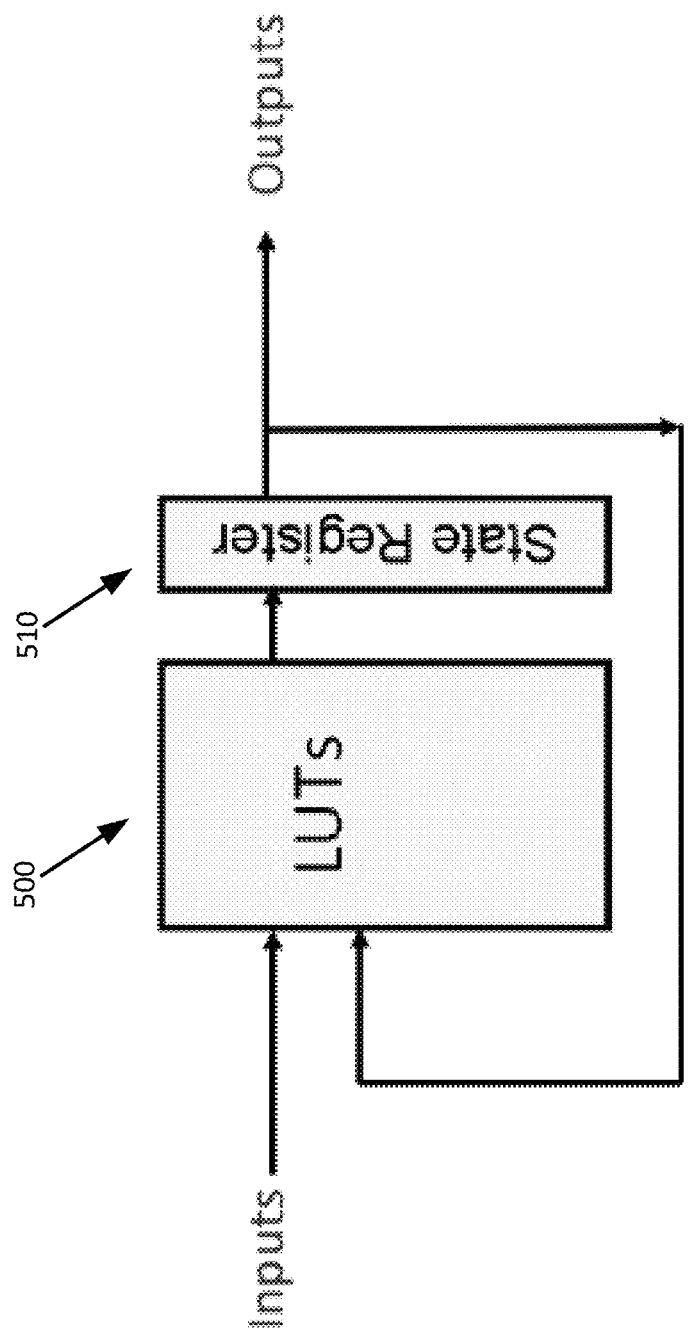
Figure 6:
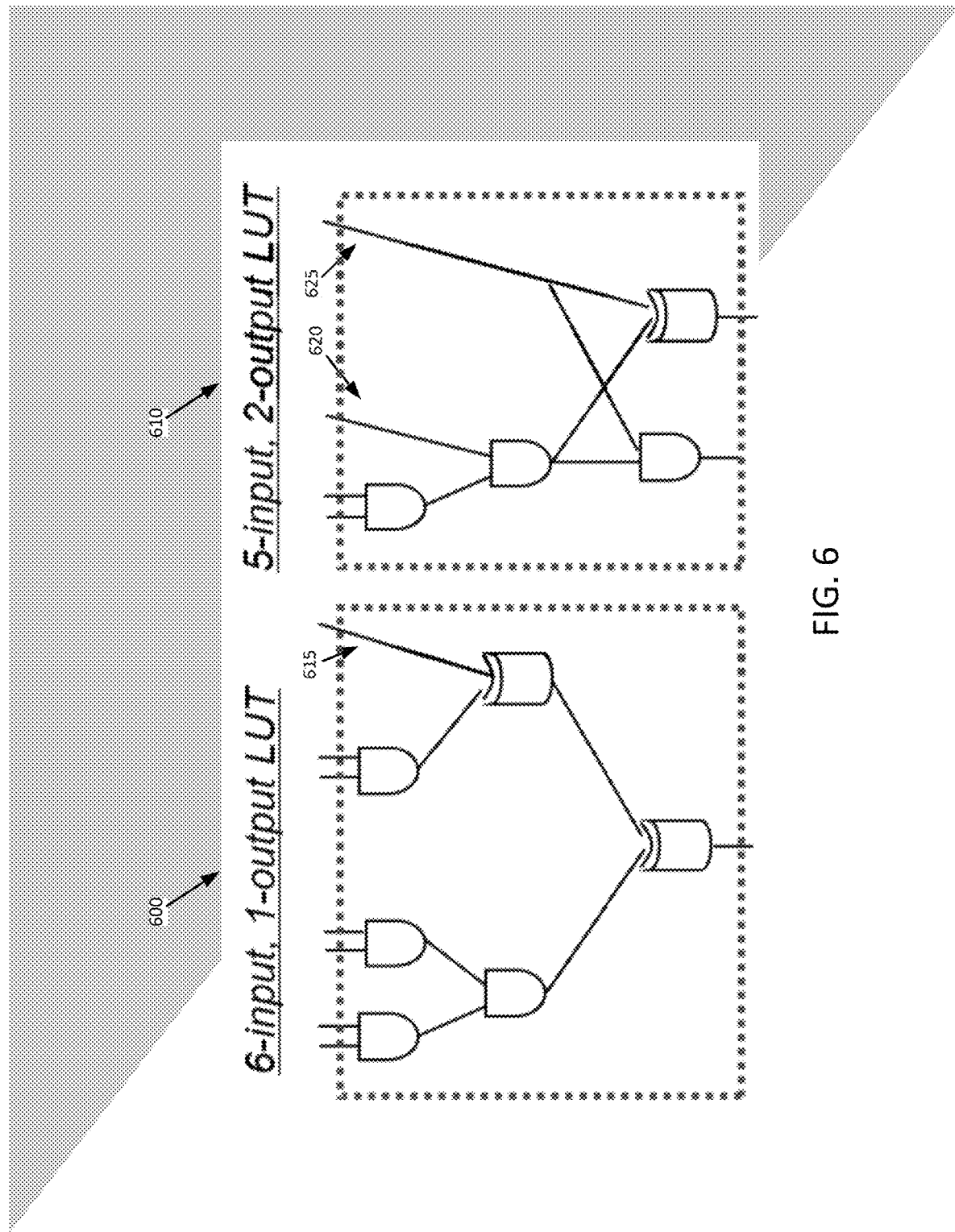
Figure 7:
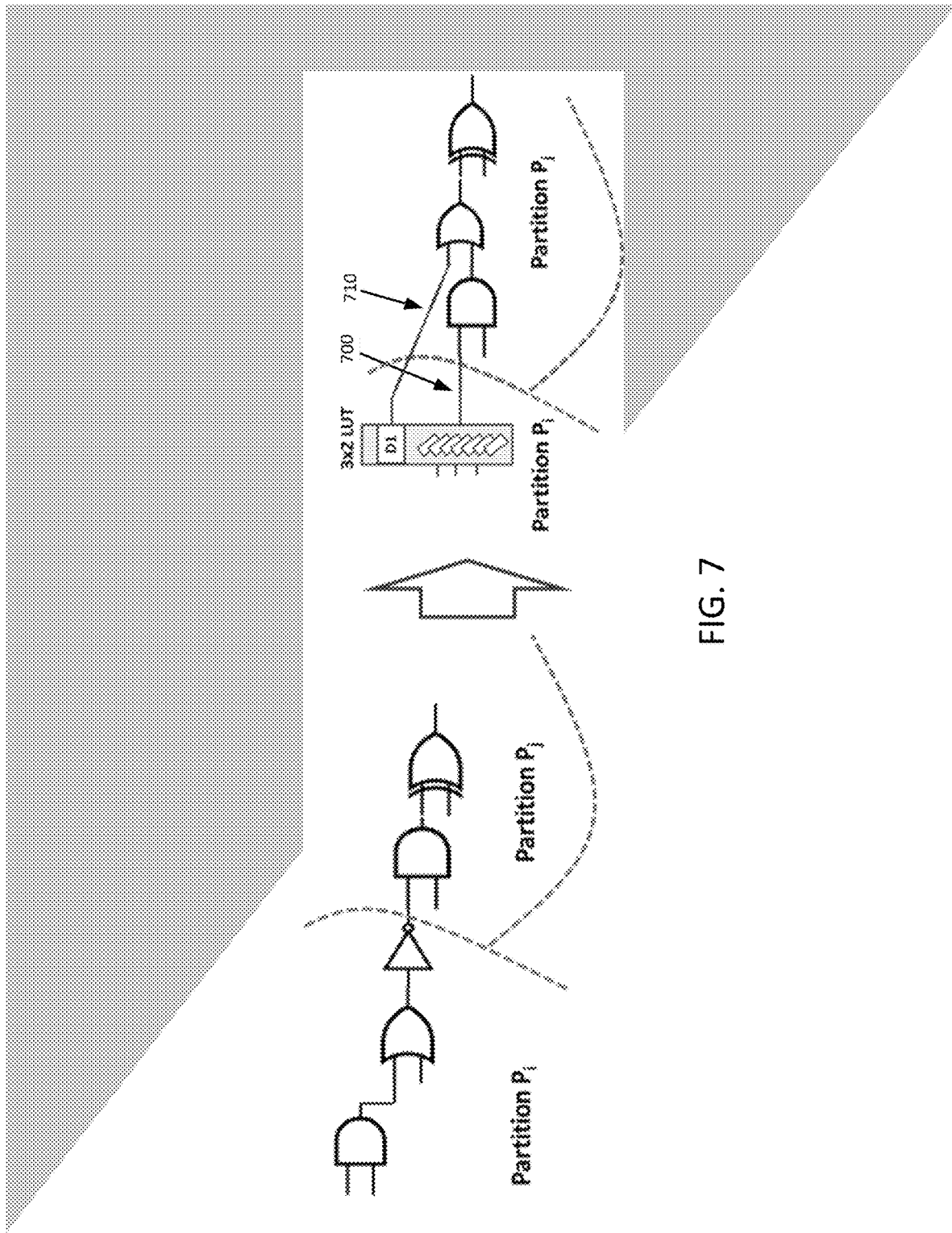
Figure 8:
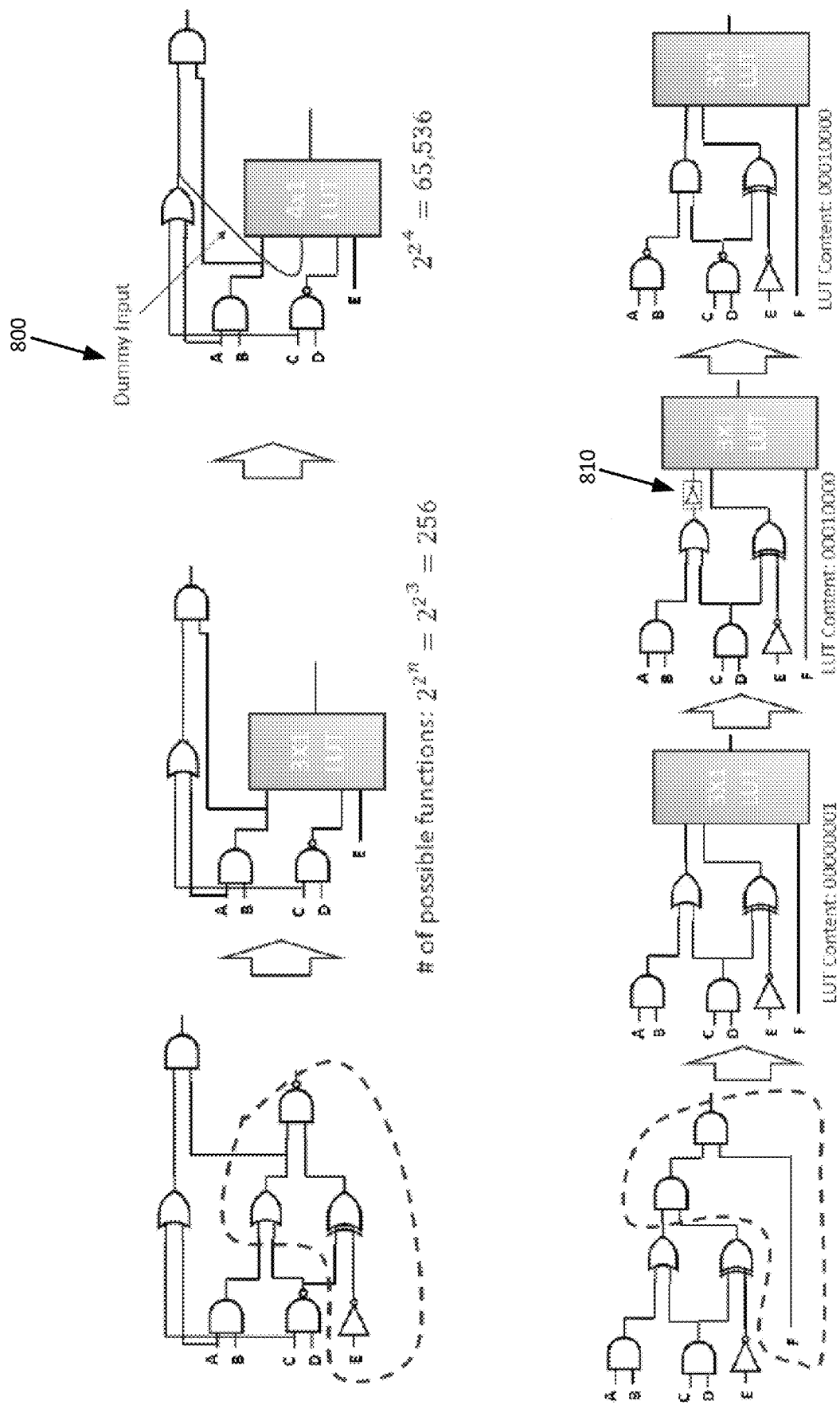
Figure 9:
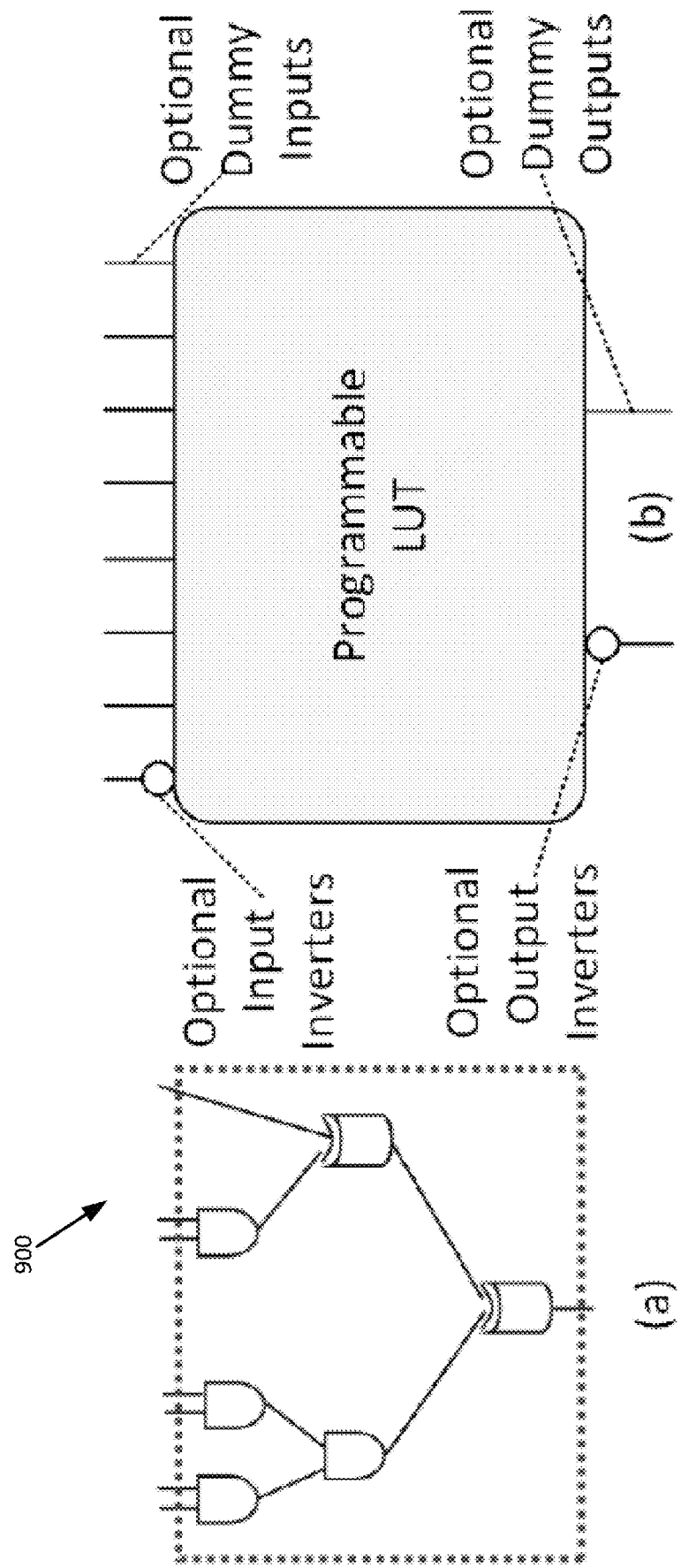
Figure 10:
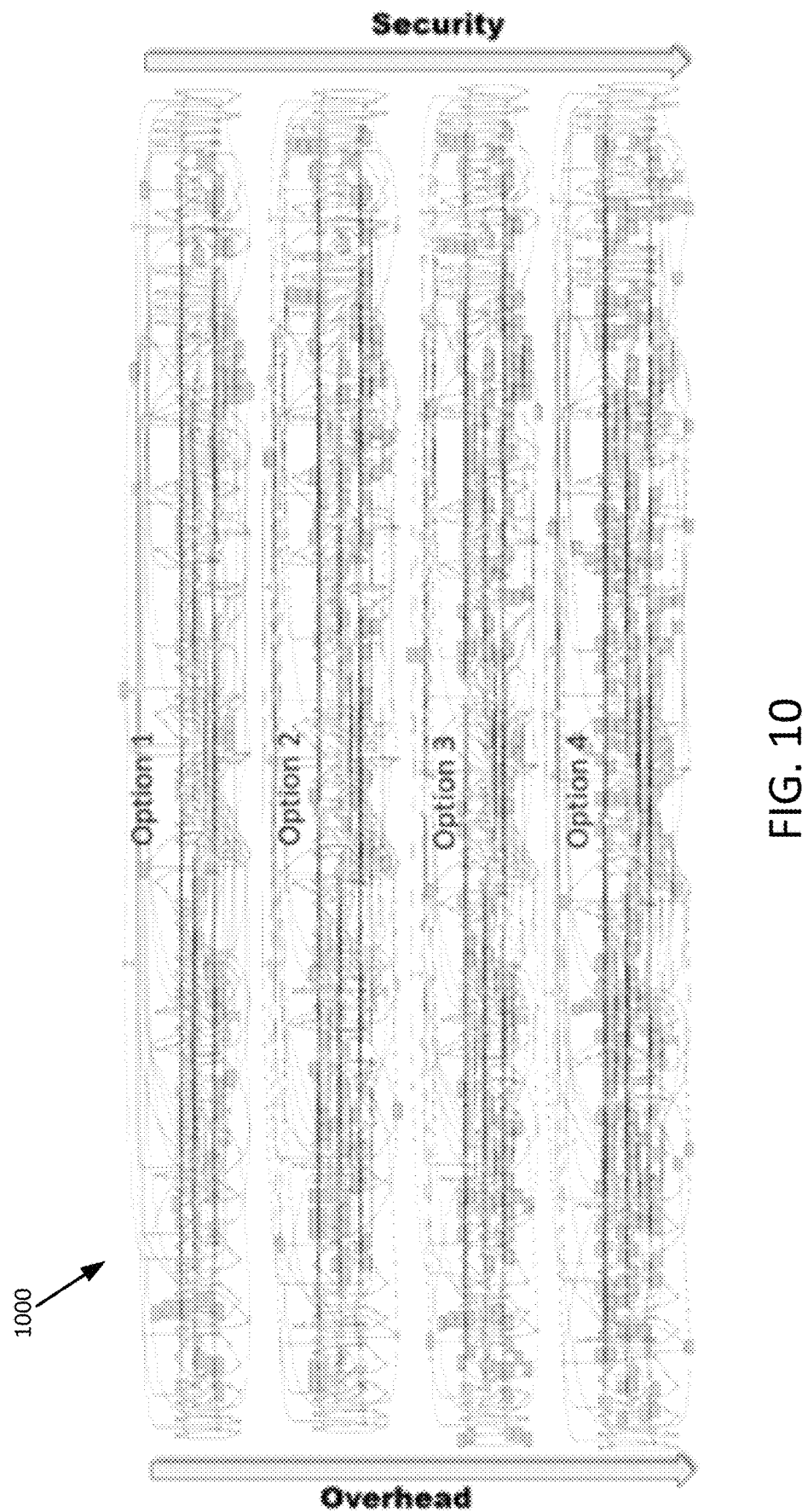
Figure 11:
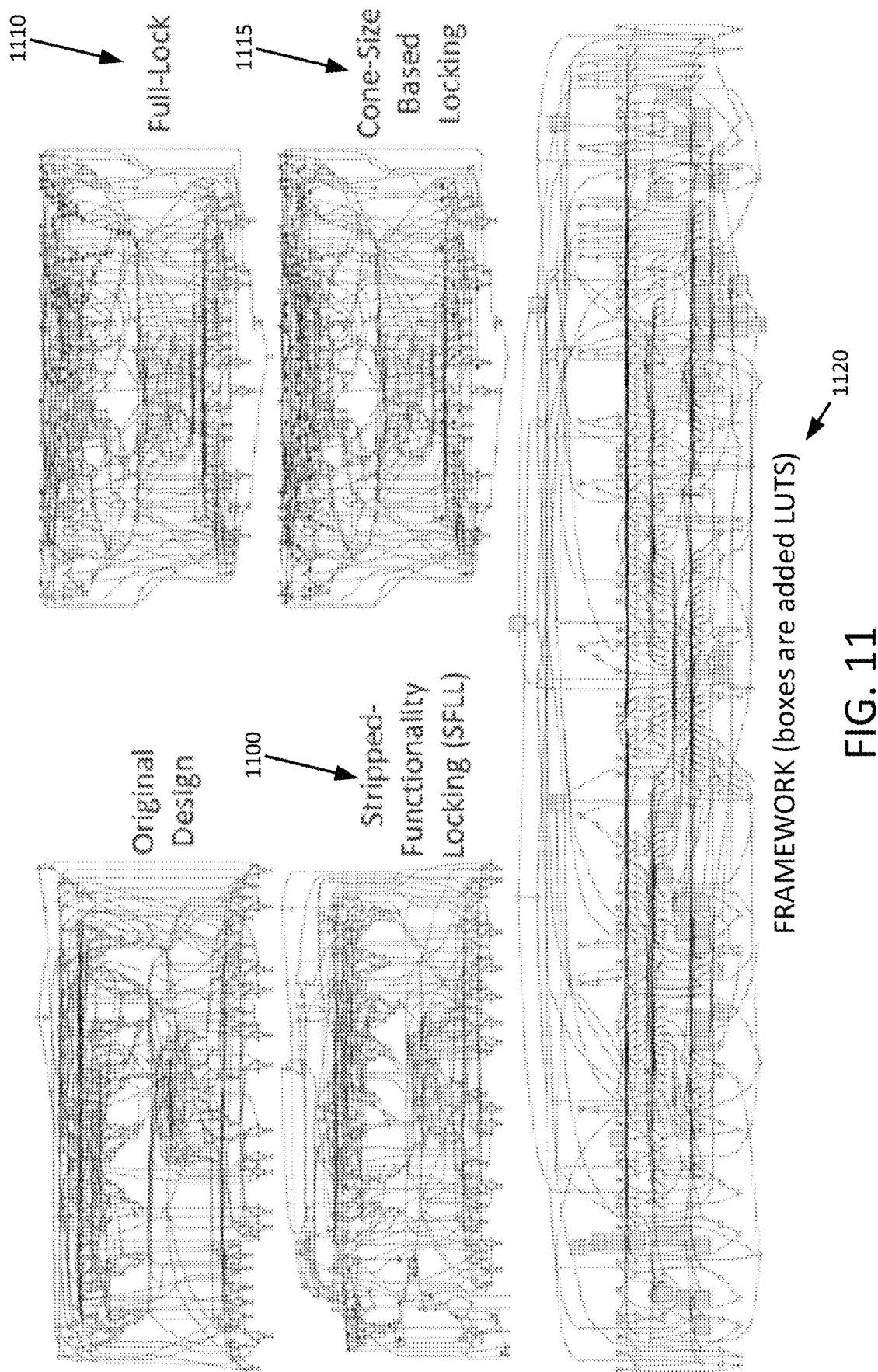

Having thus described the disclosure in general terms, reference will now be made to the accompanying drawings, which are not necessarily drawn to scale, and wherein:

FIG. 1 displays the major security issues spanning the life cycle of hardware IP;

FIG. 2 is a schematic of a computing entity that may be used in conjunction with various embodiments of the present disclosure;

FIG. 3 is a diagram demonstrating how embodiments of the present disclosure may be employed on three possible components in an IP;

FIG. 4 provides a process flow for altering an IP by removing fundamental portions of the IP and replacing the removed portions by reconfigurable logic in accordance with various embodiments of the present disclosure;

FIG. 5 provides an example of mapping an FSM with programmable logic in accordance with various embodiments of the present disclosure;

FIG. 6 provides an example of exploring optimal mapping to various size LUTs in accordance with various embodiments of the present disclosure;

FIG. 7 provides an example of maximizing structural changes in remaining logic to avoid proximity attacks in accordance with various embodiments of the present disclosure;

FIG. 8 provides examples of adding dummy inputs and outputs and implementing selective inversion of inputs and outputs in accordance with various embodiments of the present disclosure;

FIG. 9 provides an overview of the transformed aspects of removed logic in accordance with various embodiments of the present disclosure;

FIG. 10 provides a graphical representation of a benchmark where four configurations of the framework have been applied in accordance with various embodiments of the present disclosure; and FIG. 11 provides a graphical representation of a benchmark locked using existing locking techniques and the framework in accordance with various embodiments of the present disclosure.

DETAILED DESCRIPTION OF VARIOUS EMBODIMENTS

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. The following brief definition of terms shall apply throughout the application.

The term "comprising" means including, but not limited to, and should be interpreted in the manner it is typically used in the patent context. The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment). If the specification describes something as "exemplary" or an "example," it should be understood that refers to a non-exclusive example; The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

I. General Overview of Various Embodiments

Various embodiments of the disclosure are directed to an IP removal framework (which may be referred to as RIPPER: Removal of IP Programmable Replacement) that grades logic components in an IP for complexity using a metric, such as the Shannon entropy metric and removes highly complex blocks. Security by combinations needed for a brute-force attack are measured, assuming an attacker has an unlocked device (or oracle) to compare to, to represent the strongest possible attack. Here, the target security for various embodiments of the framework is greater than the security of advanced encryption standard (AES)-256 (e.g., over $2^{256}$ combinations needed in brute-force attacks). Accordingly, the framework used in various embodiments for protecting hardware IP blocks relies on identifying entropy-intensive logic blocks in control and datapath components of an IP and replacing them by reconfigurable program logic, such as hardware lookup tables (LUTs). In addition, particular embodiments of the framework use encrypted configuration bits for programming the LUTs at every power on, as well as judiciously use programmable interconnects (PIs) for datapaths, control paths, and interface logic to enhance security, if needed. Furthermore, particular embodiments of the framework also take advantage of the removed logic to introduce structural changes into the remaining logic (not removed) by incorporating various transformations into Boolean functions implemented in the configurable logic.

In traditional field-programmable gate array (FPGA) platforms, power-performance-area (PPA) is dominated (e.g., 80%) by PIs and long routing paths leading to typically 10× overhead in these parameters compared to an application-specific integrated circuit (ASIC). Accordingly, various embodiments of the framework adequately mitigate this issue due to custom placement of reconfigurable blocks with limited or no PIs. Further, since ideal LUT sizes are allocated in particular embodiments for each module and unlike FPGAs, exact circuits being mapped are known (thus leading to no wasted inputs or outputs), the resultant PPA overhead in these embodiments can be significantly smaller compared to a FPGA.

Accordingly, various embodiments of the framework provide the advantage of automatically determining the appropriate blocks in a given IP for removal and replacement by reconfigurable fabric (e.g., LUTs) that maximizes security for a given overhead constraint. In addition, various embodiments of the framework provided the advantage of transforming the remaining logic that is not removed through judicious modifications of the Boolean functions implemented into the reconfigurable fabric. These transformations may include selective inversion of the inputs to and outputs from the removed blocks, as well as addition of dummy inputs/outputs. Further, various embodiments of the framework provide the advantage of inserting, based at least in part on the target security and design overhead, a limited set of PIs in strategic places between the reconfigurable fabric and remaining logic. Furthermore, various embodiments of the framework provide the advantage of creating an efficient reconfiguration hardware for decrypting an encrypted bitstream at every power on for programming the reconfigurable fabric and PIs.

II. General Overview of Security Approaches

The move to a distributed supply-chain to address challenges in semiconductor design process has given rise to many critical security issues. FIG. 1 shows the major security issues spanning the life cycle of hardware IP 100. A large body of work has addressed various hardware IP security issues, such as Trojans, RE, counterfeiting, and piracy. Specifically, in the present disclosure, various embodiments provide an approach involving IP removal and replacement with programmable fabric, which eliminates, for an adversary in an untrusted foundry, access to sensitive design components and thus prevents IP theft and unauthorized reproduction. Though there exist several approaches that lock sequential and combinational portions of the design, they have been shown to be vulnerable to state-of-the-art attacks. To address the limitations of these function locking approaches, various embodiments of an IP removal-based protection framework are described herein that remove complex and fundamental blocks from an IP before sending to an untrusted facility (e.g., untrusted foundry). In particular embodiments, these removed blocks are replaced by programmable fabric, such as LUTs, which can be programmed at every power on by decrypting an encrypted bitstream. A brief description of various security approaches is now provided as a backdrop for the discussion of various embodiments of the framework provided herein.

Locking Methods: Different locking methods have been introduced, starting from a basic inverting logic, where XOR/XNOR gates are used as locking key-gates, to more advanced rerouting mechanisms, such as multiplexers and switch boxes. Moreover, a one-way functional-stripping operation can be implemented with a key-input that is used to restore the functionality. Such a technique is used in a Stripped-Functionality Logic Locking (SFLL) process.

Location Selection Techniques: A vital step of the locking process is the selection of appropriate locations to insert the locking logic. The basic approach is to select locations at random, which is implemented in Ending Piracy in Integrated Circuits (EPIC). Other selection approaches include (1) logic cone size method (CS), which looks for nets with large fan-in and fan-out logic cones, and (2) Secure Logic Locking (SLL), which focuses on eliminating muting and masking key-gates in order to mitigate key-sensitization attacks.

Attacks on Obfuscation: Alongside locking techniques, a number of powerful attacks and security evaluation tools have been introduced in the literature. Attacks vary in the type of analysis they do. Some of them require an unlocked circuit to observe the original functional behavior, while others require prior knowledge about the locking algorithm used. A summary of the attacks is shown in Table 1.

TABLE 1

A Summary of Potent Attacks on Obfuscated Circuits

| Attack | Type | Unlocked Design | Locking Algorithm | Key Size | Attack Confidence |
|---|---|---|---|---|---|
| SAT* | Functional | Required | Not Required | Full | Exact |
| AppSAT* | Functional | Required | Not Required | Full | Approx. |
| Removal | Strutural | Required | Not Required | Partial | Exact |
| Bypass | Strutural | Required | Not Required | Partial | Approx. |
| KSA | Functional | Required | Not Required | Partial | Exact |
| Hill-Climbing | Functional | Required | Not Required | Full | Approx. |
| SWEEP | Strutural | Not Required | Required | Partial | Approx. |
| SAIL | Strutural | Not Required | Required | Partial | Approx. |

*SAT solvers cannot break designs with complex arithmetic operations.

Boolean Satisfiability Attack

The Boolean satisfiability attack (SAT) is one of the most impactful attacks. It integrates a satisfiability algorithm (SAT-solver) that can find distinguishing input patterns (DIPs). The attack is limited to circuits that are solvable using SAT algorithms, as it is not able to break circuits that contain SAT-hard functions (such as multipliers). SARLock and Anti-SAT have been proposed to mitigate SAT attacks. By introducing a comparison function that forces the attack to eliminate small key-classes per iteration, the added locking mechanisms are able to force the SAT-solver to brute-force the key combinations, which adds complexity to the attack. However, these mitigation techniques have been proven to be vulnerable to multiple attacks, such as removal, bypass, and AppSAT. More specifically, AppSAT targets locking techniques with low output corruptibility when the circuit is in the locked mode. The attack offers "approximate keys" that restore the function of the locked circuit.

Key Sensitization Attack (KSA)

The key sensitization attack (KSA) is developed to leak the correct value of a key input to a primary output. The attack requires the locked gate-level netlist and a set of oracles, as it analyzes input patterns that can cause the key value to propagate to an output port by leveraging key-gates that mute other key-gates and mask their effect. The major limitation of this attack is scalability, as finding input patterns that can sensitize the correct key values requires exponential time.

Functional Hill-Climbing Attack

The functional hill-climbing attack is an optimization approach that treats the key-inputs as the parameters. The attack starts by assigning an initial key value that is selected randomly. A functional analysis using this key is performed, and the key is slightly updated. A comparison between the functional behavior of the initial and updated keys is performed, and the key with a higher functional matching is kept. This process iterates until the full functionality is restored.

Constant Propagation Attack

The constant propagation attack (SWEEP) is a constant propagation attack that analyzes individual key-input ports in the locked circuit. The attack is oracle-less, as it does not require access to the unlocked function. However, the attack requires a training-set of locked circuits that are obfuscated using the same technique of the target circuit. SWEEP is able to establish a correlation between the observed structural properties of the circuit and the correct key values.

Structural Analysis Using Machine Learning (SAIL)

Structural analysis machine learning (SAIL) is a machine learning structural analysis attack on combinational logic locking. Similar to SWEEP, the attack does not require oracles, but a dataset of locked designs using a similar technique to the target circuit is needed. The attack's goal is to restore the locked netlist to its pre-synthesis state by performing a sub-graph restoration prediction. SAIL is developed to target XOR/XNOR key-gates.

III. Computer Program Products, Systems, Methods, and Computing Entities

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language, such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary Computing Entity

FIG. 2 provides a schematic of a computing entity 200 that can be used in conjunction with various embodiments of the present disclosure. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 200 shown in FIG. 2 may be embodied as a plurality of computing entities, tools, and/or the like operating collectively to perform one or more processes, methods, and/or steps. As just one non-limiting example, the computing entity 200 may comprise a plurality of individual data tools, each of which may perform specified tasks and/or processes.

Depending on the embodiment, the computing entity 200 may include one or more network and/or communications interfaces 225 for communicating with various computing entities, such as by communicating data, content, information, and/or similar terms used herein interchangeably that can be transmitted, received, operated on, processed, displayed, stored, and/or the like. Thus, in certain embodiments, the computing entity 200 may be configured to receive data from one or more data sources and/or devices, as well as receive data indicative of input, for example, from a device.

The networks used for communicating may include, but are not limited to, any one or a combination of different types of suitable communications networks, such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 200 includes or is in communication with one or more processing elements 210 (also referred to as processors, processing circuitry, and/or similar terms used herein interchangeably) that communicate with other elements within the computing entity 200 via a bus 230, for example, or network connection. As will be understood, the processing element 210 may be embodied in several different ways. For example, the processing element 210 may be embodied as one or more complex programmable logic devices (CPLDs), microprocessors, multi-core processors, coprocessing entities, application-specific instruction-set processors (ASIPs), and/or controllers. Further, the processing element 210 may be embodied as one or more other processing devices or circuitry. The term circuitry may refer to an entirely hardware embodiment or a combination of hardware and computer program products. Thus, the processing element 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 210 may be configured for a particular use or configured to execute instructions stored in volatile or non-volatile media or otherwise accessible to the processing element 210. As such, whether configured by hardware, computer program products, or a combination thereof, the processing element 210 may be capable of performing steps or operations according to embodiments of the present invention when configured accordingly.

In various embodiments, the computing entity 200 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 220 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 220 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the memory media 220 may also be embodied as a data storage device or devices, as a separate database server or servers, or as a combination of data storage devices and separate database servers. Further, in some embodiments, the memory media 220 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the invention may be stored.

In various embodiments, the computing entity 200 may further include or be in communication with volatile media (also referred to as volatile storage, memory, memory storage, memory circuitry and/or similar terms used herein interchangeably). For instance, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 215 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 210. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 200 with the assistance of the processing element 210 and operating system.

Although not shown, the computing entity 200 may include or be in communication with one or more input elements, such as a keyboard input, a mouse input, a touch screen/display input, motion input, movement input, audio input, pointing device input, joystick input, keypad input, and/or the like. The computing entity 200 may also include or be in communication with one or more output elements (not shown), such as audio output, video output, screen/display/interface output, motion output, movement output, and/or the like.

As will be appreciated, one or more of the computing entity's components may be located remotely from other computing entity components, such as in a distributed system. Furthermore, one or more of the components may be aggregated and additional components performing functions described herein may be included in the computing entity 200. Thus, the computing entity 200 can be adapted to accommodate a variety of needs and circumstances.

IV. Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

RIPPER Module

Various embodiments of the framework are configured to alter an IP by removing fundamental portions of the IP and replacing the removed portions by reconfigurable logic, hence leaving the resultant IP functionally and structurally unrecognizable. Accordingly, various embodiments of the framework aim to perform an optimal removal based at least in part on the type of the circuit, the percentage of circuit removal, and one or more targeted performance constraints. In particular embodiments, the removed portions of the IP are replaced with light-weight reconfigurable logic, where a correct configuration bitstream is required for the circuit to function properly. FIG. 3 demonstrates how embodiments of the framework may be employed on three possible components in an IP: a finite state machine (FSM) 300 used to implement the control path; interface logic 310 (e.g. mux/demux, encoders/decoders, etc.); and datapath logic 315 (e.g., arithmetic and logic units).

Turning now to FIG. 4, additional details are provided regarding a process flow for altering an IP by removing fundamental portions of the IP and replacing the removed portions by reconfigurable logic according to various embodiments. FIG. 4 is a flow diagram showing a RIPPER module for performing such functionality according to various embodiments of the disclosure. For example, the flow diagram show % n in FIG. 4 may correspond to operations carried out by a processing element 210 in a computing entity 200, as it executes the RIPPER module.

The process flow 400 begins with the RIPPER module converting a representation of a design such as register-transfer level (RTL) or gate-level netlist to generate a control and data flow graph (CDFG) for the design in Operation 410. For instance, in particular embodiments, the RIPPER module may be configured to parse the representation (e.g., the RTL) and transform concurrent blocks of the RTL code into a CDFG data structure. The RIPPER module may then merge small CDFGs to build larger combined CDFGs. In some embodiments, the RIPPER module may also receive user-specified constraints, including security and PPA overhead, as input. Accordingly, the CDFG structure may provide support for a variety of graph algorithms to allow for easier identification of fundamental logic blocks for removal. Thus, the CDFG representation of the circuit in various embodiments allows for intelligent and efficient functional and structural analysis of the circuit.

The RIPPER module then conducts an analysis on the CDFG representation of the design to identify sequential logic and combinational paths in the design to remove and replace by reconfigurable logic, such as LUTs/registers, in Operation 415. Here, in particular embodiments, the RIPPER module takes the CDFG representation of the design and performs a thorough circuit analysis to identify control and data paths, as well as interface logic. The RIPPER module then performs an entropy analysis on the identified components, where the quantity of disorder and randomness for each path is measured. For example, in some embodiments, the RIPPER module calculates the Shannon entropy on the identified components. The Shannon entropy represents how difficult it is to predict the structural information of a state machine or reverse-engineer it.

Next, the RIPPER module replaces the control path(s) in Operation 420. For instance, the RIPPER module may be configured in some embodiments to perform this particular operation by selecting and removing the control logic meeting an entropy threshold (e.g., with the highest entropy). For example, in particular embodiments, the RIPPER module may be configured to remove the control logic by replacing fundamental parts in a finite state machine (FSM) with one or more LUTs (and optionally PIs). These LUTs may contain all the necessary logic modules that can re-establish the original FSM. Turning briefly to FIG. 5, FIG. 5 demonstrates how an FSM can be replaced with configurable logic realized with mapping the state transition functions into LUTs 500 and programming the state transition registers 510.

Generally, a control logic corresponding to a control path to be replaced can be defined with partitions in the design. Turning briefly to FIG. 7, for example, two partitions $P_i$ and $P_j$ each represent a different control logic each associated with a control path. Thus, selecting and removing a control logic may comprise identifying one or more gates, registers, components, and/or the like of the design within a partition and removing said gates, registers, components, and/rot the like.

Returning to FIG. 4, the RIPPER module replaces one or more data path components in Operation 425. Again, in particular embodiments, the RIPPER module may be configured to replace the one or more data path components with entropy meeting a threshold (e.g., with the highest entropy). Here, in particular embodiments, the RIPPER module removes the one or more data paths by capturing and replacing a logic fan-in cone and replacing the logic cone with reconfigurable logic, such as one or more LUTs. Accordingly, in some embodiments, the RIPPER module may be configured to explore the datapath logic to select optimal sizes for the inserted LUTs, where the configuration bits of the added LUTs represent the original functionality of the removed logic cones. Turning briefly to FIG. 6, this figure demonstrates various options 600, 610 of realizing LUTs in datapath blocks. For example, dummy inputs/outputs 615, 620, 625 may be added to increase structural transformations in the remaining logic.

In addition, FIG. 7 demonstrates adding dummy outputs 700, 710 to LUTs to enable structural changes in the fanout logic. To ensure a randomized transformation, dummy inputs and outputs may be added to the selected partition in various embodiments. Additionally, selective inversion of the inputs and outputs may also be implemented at random in various embodiments. Both of these features 800, 810 are illustrated in FIG. 8. For example, FIG. 8 demonstrates the addition of another input to randomly transform the replacement 3X1 LUT to a 4X1 LUT (e.g., three inputs to four inputs). As a result, the number of possible functions increases from 256 to 65,536, in the illustrated embodiment. As another example, FIG. 8 illustrates an inverter (a NOT gate) added to the output of a logic gate at 810 to ensure a randomized transformation.

Returning to FIG. 4, the RIPPER module performs constrained logic synthesis for optimization of PPA and formal verification to check functional correctness in Operation 430. Specifically, in various embodiments, the RIPPER module synthesizes the modified circuit using a set of user-defined constraints in terms of PPA. In particular embodiments, if the security provided by the transformation does not satisfy a threshold, then the RIPPER module may be configured to use an iterative process to further transform the design. Accordingly, in these embodiments, the RIPPER module can be configured to enable seamless trade-off between security and overhead selecting and adjusting a different percentage of logic blocks for replacement with reconfigurable structures. An overview 900 of the transformed aspects of the removed logic is shown in FIG. 9.

Finally, it is noted that in various embodiments, minimally flexible interconnects may be used to implement the configurable fabric between the datapath components. Unlike an FPGA, which must ideally support any possible application, the configurable interconnect in various embodiments only needs to support one application, with enough additional configuration options to provide adequate security. Accordingly, depending on the size of the targeted datapath, various network topologies can be investigated to provide the most attractive tradeoffs between overhead and security.

V. Exemplary Studies

An evaluation of the effectiveness of various embodiments of the framework is conducted for a set of ISCAS85 benchmarks as well as one MIT CEP IP block. Accordingly, a detailed analysis is performed for the ISCAS85 benchmark, C1355, which is a 32-bit error correction unit. Here, four options are implemented on the C1355 to tradeoff security with overhead by turning the Shannon entropy knob to select a varying number of blocks for replacement with LUTs. In each option, the percentage of removal is determined, ranging from 8%, to 30% of the design. To control the overhead, inserted LUTs are constrained to have a maximum of 6-inputs. The graphical representation 1000 on the structure of the design for the four options are shown in FIG. 10. Table 2 presents the security of the proposed solution as well as area, power, performance overheads.

TABLE 2

Security and Performance Results of Framework Applied to C1355 Benchmark Using 4 Security Options

| Benchmark | Security Option | % of Logic Removed | Possible Functions | Area Overhead (%) | Power Overhead (%) | Performance Overhead (%) |
|---|---|---|---|---|---|---|
| c1355 | Option 1 | 8% | $2^{112}$ | 14.62 | 15.32 | −6.07 |
|  | Option 2 | 15% | $2^{148}$ | 19.25 | 8.60 | 1.13 |
|  | Option 3 | 20% | $2^{256}$ | 17.32 | 24.36 | 5.82 |
|  | Option 4 | 30% | $2^{320}$ | 22.95 | 16.54 | 3.32 |

FIG. 10 demonstrates that as the removal percentage is increased, the number of added LUTs increases, and the defining features of the original circuit are gradually lost, making it harder for an adversary to reverse-engineer or clone it. However, as the removal percentage is increased, the overhead increases. This increase is likely due to the added reconfigurable logic (i.e., LUTs), which utilizes more resources compared to custom implementation.

Reconfigurability

In various embodiments, the bitstream that represents the configuration of the LUTs (and optionally limited set of PIs) can be encrypted by AES-256 encryption routine. The encrypted bitstream can be decrypted at every power on for programming the LUTs. A serial shift register can be used that receives the encrypted bitfile. Next, the bitstream is decrypted and serially shifted into the configurable architecture (LUTs/PIs). This can be accomplished in particular embodiments by having a chain of configuration FFs through every configurable component. One FF per programmable connection is needed. The RAM in the LUTs do not require any additional FFs—they will simply need a small configuration FSM.

Security Analysis and Metrics

A quantifiable measure of security called Possible Functions can be used in various embodiments that represents the number of possible Boolean functions an adversary needs to try to get back to the original design from a transformed one with critical blocks replaced with LUTs. This metric is effective in quantifying the complexity of restoring the original function from the point of the attacker. The number of possible functions is computed in Eqns. 1 and 2 as follows:

$$F_{count} = 2^L \quad (1)$$

$$L = \sum_{i=1}^{n} LUT_{size}[i] \quad (2)$$

In Equations 1 and 2, $F_{count}$ represents the total number of possible functions, n represents the number of added LUTs, and $LUT_{size}[i]$ represents the size of the $i^{th}$ added LUT. The results in Table 3 show security and performance results of various embodiments of the framework applied to different benchmarks. Moreover, the results in Table 3 address the tradeoff between security and overhead, where larger removal rates result in a more secure design at the expense of additional PPA overhead.

TABLE 3

Security and Performance Results of Framework Applied to Various Benchmarks

| Benchmark | % of Logic Removed | Functions ($F_{count}$) | Failure Index (%) | SAT Attack Complexity | Area Overhead (%) | Power Overhead (%) | Performance Overhead (%) |
|---|---|---|---|---|---|---|---|
| c1355 | 8% | $2^{112}$ | 100 | TO | 14.62 | 15.32 | −6.97 |
| c7552 | 15% | $2^{216}$ | 100 | TO | 6.69 | 0.96 | 26.78 |
| des3* | 20% | $2^{256}$ | 100 | TO | 3.76 | 3.66 | 0.0 |

*Triple DES encryption IP from MIT CEP

Graphical representations of the benchmark C1355 being locked using traditional techniques, and the framework are shown in FIG. 11. The traditional methods include stripped-functionality logic locking 1100, full-lock 1110, and cone-based locking 1115, and the benchmark C1355 locked using an embodiment of the framework 1120 is shown at the bottom on the figure. Here, FIG. 11 demonstrates that for the traditional techniques 1100, 1110, 1115, the key-entry nodes are clustered in one region of the circuit. However, the framework 1120 performs a logic removal that distributes the transformation across the entire design and completely alters the graphical representation of the locked circuit.

Correctness Verification

IP removal and replacement with programmable logic can be performed on an RTL or gate-level netlist in various embodiments by a trusted designer. Accordingly, two other objects may be used in particular embodiments based at least in part on the transformed designed: 1) a cut-point matched golden netlist; and 2) an FPGA emulator. The former can be used subsequently for formal verification—in particular, equivalence checking, and the latter for functional validation. For instance, formal verification can be performed between the original design and the converted design+ bitstream (represented by its equivalent Boolean function). The transformed gate-level golden netlist can provide a cut-point-matched model for formal verification using a commercial tool such as Synopsys Formality.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed, and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
generating, using one or more processors, a control and data flow graph (CDFG) representing a hardware IP design, the CDFG comprising a plurality of control paths and/or data paths;
performing, using the one or more processors, an entropy analysis of the CDFG to determine an entropy measure for each of the plurality of control paths and/or data paths, the entropy measure representing a complexity of an associated control path or an associated data path;
identifying, using the one or more processors, a subset of control paths and/or data paths for removal from the hardware IP design based at least in part on the entropy measure for each of the plurality of control paths and/or data paths;
generating, using the one or more processors, a reduced design based at least in part on: (i) replacing control logic of the hardware IP design represented by each control path of the subset of control paths and/or data paths for removal with first reconfigurable logic, and (ii) replacing data path logic of the hardware IP design represented by each data path of the subset of control paths and/or data paths with second reconfigurable logic; and
providing, using the one or more processors, access to the reduced design.

2. The method of claim 1, wherein access to the reduced design is provided in accordance with a determination that the reduced design is functionally correct with respect to the hardware IP design.

3. The method of claim 1, wherein the control logic comprises one or more parts in a finite state machine and the first reconfigurable logic comprises one or more logic modules that can re-establish one or more state transition functions in the finite state machine.

4. The method of claim 1, wherein the data path logic comprises a logic fan-in cone and the second reconfigurable logic comprises configuration bits representing original functionality of the logic fan-in cone.

5. The method of claim 1, wherein the first and second reconfigurable logic are configured to be programmed at every power on by decrypting an encrypted bitstream.

6. The method of claim 1, further comprising performing a logic synthesis on the reduced design and optimizing power-performance-area of the reduced design in accordance with the logic synthesis.

7. The method of claim 1, wherein the CDFG representing the hardware IP design is generated from a register-transfer level or gate-level netlist of the hardware IP design.

8. The method of claim 1, wherein the first and second reconfigurable logic comprises at least one of a hardware lookup table or a programmable interconnect.

9. An apparatus comprising one or more processors and at least one memory comprising computer executable instructions, the at least one memory and the computer executable instructions configured to, with the one or more processors, cause the apparatus to:
- generate a control and data flow graph (CDFG) representing a hardware IP design, the CDFG comprising a plurality of control paths and/or data paths;
- perform an entropy analysis of the CDFG to determine an entropy measure for each of the plurality of control paths and/or data paths, the entropy measure representing a complexity of an associated control path or an associated data path;
- identify a subset of control paths and/or data paths for removal from the hardware IP design based at least in part on the entropy measure for each of the plurality of control paths and/or data paths;
- generate a reduced design based at least in part on: (i) replacing control logic of the hardware IP design represented by each control path of the subset of control paths and/or data paths for removal with first reconfigurable logic, and (ii) replacing data path logic of the hardware IP design represented by each data path of the subset of control paths and/or data paths with second reconfigurable logic; and
- provide access to the reduced design.

10. The apparatus of claim 9, wherein access to the reduced design is provided in accordance with a determination that the reduced design is functionally correct with respect to the hardware IP design.

11. The apparatus of claim 9, wherein the control logic comprises one or more parts in a finite state machine and the first reconfigurable logic comprises one or more logic modules that can re-establish one or more state transition functions in the finite state machine.

12. The apparatus of claim 9, wherein the data path logic comprises a logic fan-in cone and the second reconfigurable logic comprises configuration bits representing original functionality of the logic fan-in cone.

13. The apparatus of claim 9, wherein the first and second reconfigurable logic are configured to be programmed at every power on by decrypting an encrypted bitstream.

14. The apparatus of claim 9, wherein the at least one memory and the computer executable instructions are further configured to, with the one or more processors, cause the apparatus to perform a logic synthesis on the reduced design and optimize power-performance-area of the reduced design in accordance with the logic synthesis.

15. The apparatus of claim 9, wherein the CDFG representing the hardware IP design is generated from a register-transfer level or gate-level netlist of the hardware IP design.

16. The apparatus of claim 9, wherein the first and second reconfigurable logic comprises at least one of a hardware lookup table or a programmable interconnect.

17. A computer program product comprising at least one non-transitory computer-readable storage medium having computer-readable program code portions stored therein, the computer-readable program code portions comprising executable portions configured to cause one or more processors to:
- generate a control and data flow graph (CDFG) representing a hardware IP design, the CDFG comprising a plurality of control paths and/or data paths;
- perform an entropy analysis of the CDFG to determine an entropy measure for each of the plurality of control paths and/or data paths, the entropy measure representing a complexity of an associated control path or an associated data path;
- identify a subset of control paths and/or data paths for removal from the hardware IP design based at least in part on the entropy measure for each of the plurality of control paths and/or data paths;
- generate a reduced design based at least in part on: (i) replacing control logic of the hardware IP design represented by each control path of the subset of control paths and/or data paths for removal with first reconfigurable logic, and (ii) replacing data path logic of the hardware IP design represented by each data path of the subset of control paths and/or data paths with second reconfigurable logic; and
- provide access to the reduced design.

18. The computer program product of claim 17, wherein access to the reduced design is provided in accordance with a determination that the reduced design is functionally correct with respect to the hardware IP design.

19. The computer program product of claim 17, wherein the control logic comprises one or more parts in a finite state machine and the first reconfigurable logic comprises one or more logic modules that can re-establish one or more state transition functions in the finite state machine.

20. The computer program product of claim 17, wherein the data path logic comprises a logic fan-in cone and the second reconfigurable logic comprises configuration bits representing original functionality of the logic fan-in cone.

* * * * *